(12) United States Patent
Brunton et al.

(10) Patent No.: US 9,010,131 B2
(45) Date of Patent: Apr. 21, 2015

(54) METHODS AND APPARATUS FOR DEWAR AND COLD SHIELD ASSEMBLIES

(75) Inventors: Daniel W. Brunton, Tucson, AZ (US); Justin C. Jenia, Tucson, AZ (US); Paul M. Lyons, Tucson, AZ (US); Jim R. Hicks, Tucson, AZ (US); Bret J. Ashby, Tucson, AZ (US); Barry A. Rovner, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 870 days.

(21) Appl. No.: 12/498,896

(22) Filed: Jul. 7, 2009

(65) Prior Publication Data

US 2011/0005238 A1    Jan. 13, 2011

(51) Int. Cl.
| | |
|---|---|
| *F25B 19/00* | (2006.01) |
| *F25B 19/02* | (2006.01) |
| *F25D 23/12* | (2006.01) |
| *G01J 5/06* | (2006.01) |

(52) U.S. Cl.
CPC ...................................... *G01J 5/061* (2013.01)

(58) Field of Classification Search
CPC ............... F17C 2201/0133; F17C 2201/0166; F17C 2201/035; F17C 2203/0395; F17C 2203/0682; F17C 2227/0376; F17C 2227/0379; F17C 2227/0381

USPC ......................... 62/51.1, 51.2, 259.2; 250/352
See application file for complete search history.

(56) References Cited

U.S. PATENT DOCUMENTS

| | | | |
|---|---|---|---|
| 3,732,421 A | 5/1973 | Kunimoto et al. | |
| 4,206,354 A * | 6/1980 | Small, Jr. | 250/349 |
| 4,862,002 A * | 8/1989 | Wang et al. | 250/352 |
| 5,006,505 A * | 4/1991 | Skertic | 505/163 |
| 5,111,050 A * | 5/1992 | Maassen et al. | 250/352 |
| 5,177,364 A * | 1/1993 | Gowlett et al. | 250/352 |
| 5,187,939 A * | 2/1993 | Skertic et al. | 62/51.2 |
| 5,260,575 A | 11/1993 | Iwasaki et al. | |
| 5,592,822 A * | 1/1997 | Stubbs | 62/51.2 |
| 5,598,966 A * | 2/1997 | Romano et al. | 228/124.6 |
| 6,430,941 B1 * | 8/2002 | Mordechai et al. | 62/51.2 |
| 2005/0186823 A1 * | 8/2005 | Ring et al. | 439/322 |

OTHER PUBLICATIONS

Infrared Astronomical Satellite, C. A. Beichman, 1988, National Aeronautics and Space Administration, vol. 1.*

* cited by examiner

*Primary Examiner* — Frantz Jules
*Assistant Examiner* — Webeshet Mengesha

(57) ABSTRACT

A Dewar apparatus includes a focal plane array (FPA) component coupled to an FPA carrier, and a cold bridge coupled to the FPA carrier. A cold shield is aligned with the optical axis and coupled to the cold bridge (e.g., via a direct-metal bond), and at least one cryostat enclosure is similarly coupled to the cold bridge such that it has an axis that is noncollinear with the optical axis.

21 Claims, 4 Drawing Sheets

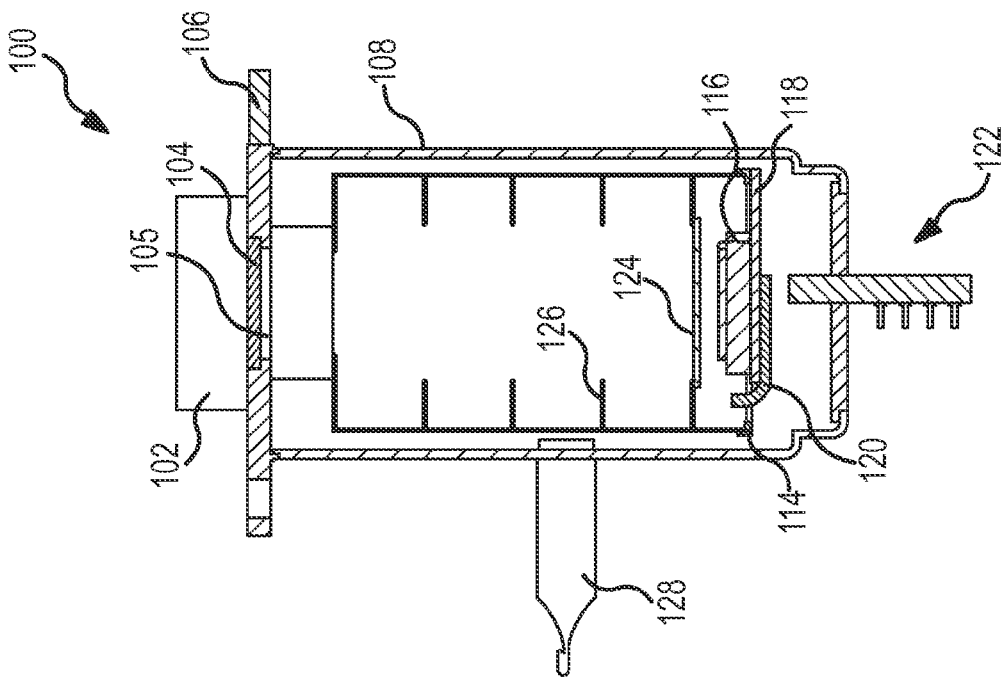
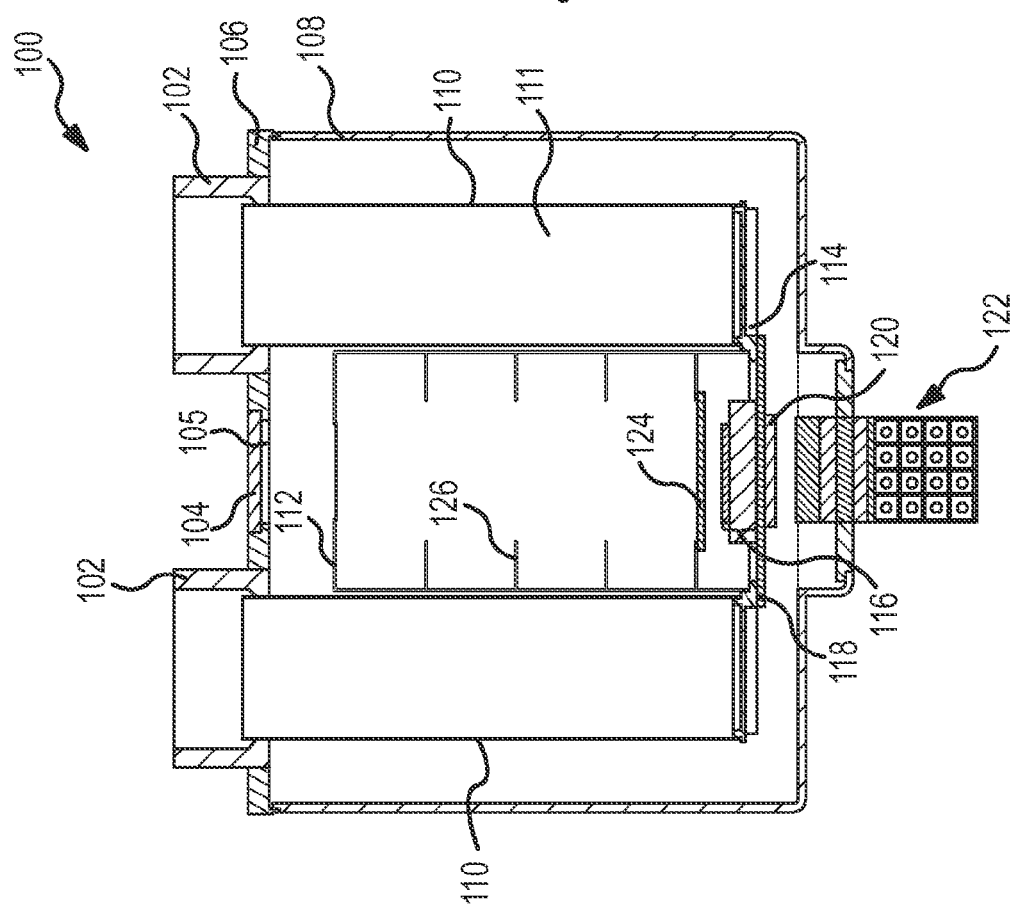
FIG. 1
FIG. 2

METHODS AND APPARATUS FOR DEWAR AND COLD SHIELD ASSEMBLIES

TECHNICAL FIELD

The present invention generally relates to Dewar flask assemblies, and more particularly relates to the use of such Dewars and cold shields in connection with infrared sensors and other detector systems.

BACKGROUND

Dewar flasks (or simply "Dewars") used in connection with sensing systems are designed to balance a number of competing objectives, including line-of-sight stability, high thermal isolation, reduced cool-down times, thermal stability at temperature, and cold shielding effectiveness. Traditional Dewar designs, which have evolved from those developed in the 1950s, conventionally include a cold shield aligned with the optical axis of the detector and a cryostat component (e.g., a cryostat enclosure) similarly aligned adjacent the backside of the detector.

Improved resolution and field-of-view requirements have led to a vast increase in the number (and thus mass) of the sensing elements within the detector assembly. As the mass of the detector system increases, so does the associated thermal and mechanical mass of the system. At the same time, the trend toward longer cold shields for lower background radiation undesirably increases the time necessary to achieve steady-state thermal conditions. Furthermore, conventional systems typically depend on the cryostat bore to provide structural stiffness, which must be balanced against the degree of thermal isolation provided.

Accordingly, it is desirable to provide improved and compact Dewar flask designs. Other desirable features and characteristics of the present invention will become apparent from the subsequent detailed description and the appended claims, taken in conjunction with the accompanying drawings and the foregoing technical field and background.

BRIEF SUMMARY

In accordance with one embodiment of the present invention, a Dewar apparatus includes a focal plane array (FPA) component coupled to an FPA carrier, and a cold bridge coupled to the FPA carrier. A cold shield is aligned with the optical axis and coupled to the cold bridge (e.g., via a direct-metal bond), and at least one cryostat enclosure is similarly coupled to the cold bridge such that it has an axis that is noncollinear with the optical axis.

A method in accordance with one embodiment includes forming a first subassembly by coupling the focal plane array component to the carrier (e.g., using relatively low-temperature operations), forming a second subassembly by coupling the cryostat enclosure and the cold shield to the cold bridge (e.g., using relatively high-temperature operations), and coupling the first subassembly to the second assembly such that the cold bridge is thermally contiguous with the carrier and the cryostat enclosure has an axis that is noncollinear with respect to the optical axis.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIG. 1 is a front, cross-sectional view of a Dewar assembly in accordance with one embodiment of the invention;

FIG. 2 is a side, cross-sectional view of the Dewar assembly shown in FIG. 1;

DETAILED DESCRIPTION

Figure 3:
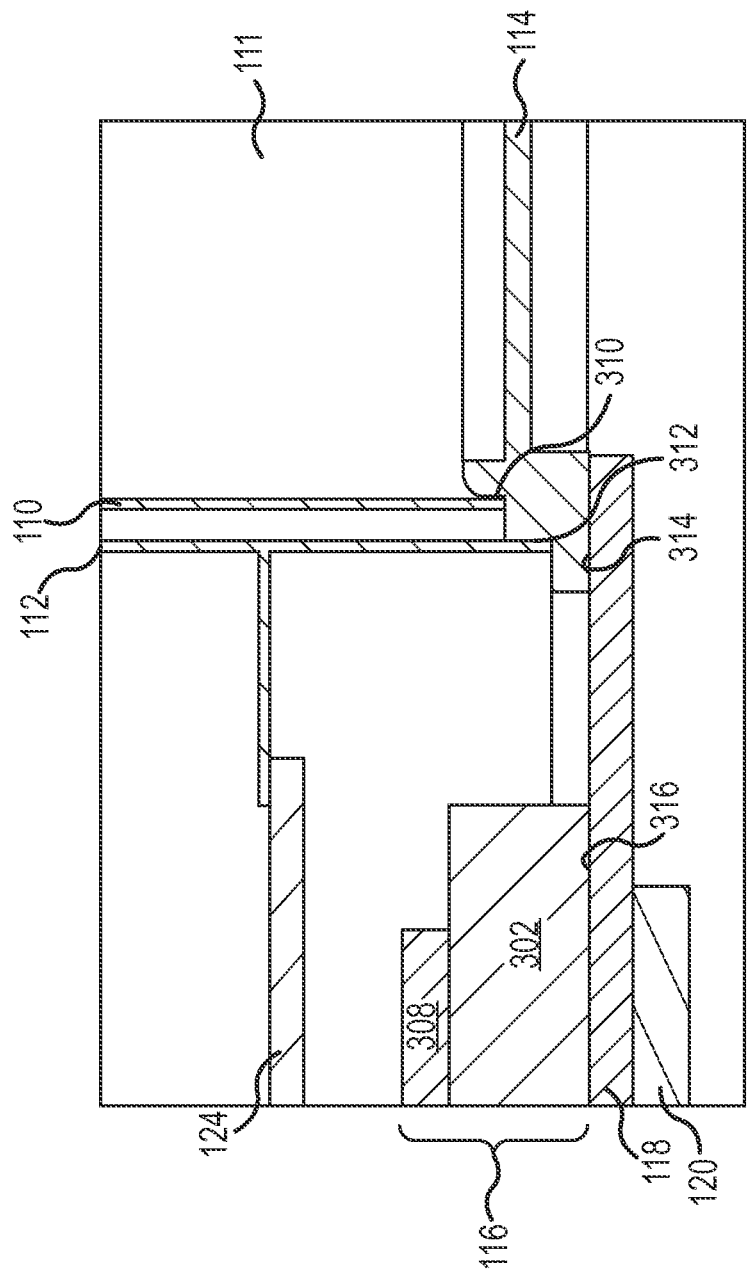
FIG. 3 is a close-up view of various interfaces within the Dewar assembly of FIG. 1.

The following discussion generally relates to a dewar/cold shield assembly with improved heat transfer characteristics which allows a more versatile range of geometries and configurations. In that regard, the following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to heat transfer, FPAs, Dewar flasks, cryogenics, infrared sensors, semiconductor packaging, and the like need not, and are not, described in detail herein.

Referring now to the front and side cut-away views of FIGS. 1 and 2, a Dewar apparatus or assembly 100 in accordance with one embodiment of the invention generally includes a focal plane array (FPA) component 116 coupled to an FPA carrier (or simply "carrier") 118, such that FPA 116 is aligned along an optical axis defined by a surface normal extending from FPA 116 (i.e. the vertical direction of FIG. 1). FPA 116 may comprise any number of conventional semiconductor devices and related components suitable for sensing the incident light energy.

A cold bridge 114 is suitably coupled to carrier 118 (e.g., along an outer perimeter of carrier 118), and a cold shield 112 is aligned with the optical axis and coupled to cold bridge 114. Cold shield 112 will typically include one or more baffles 126, filters 124, and the like. In accordance with one embodiment, cold bridge 114 may include one or more channels for cryogen transfer or other heat transfer enhancing features.

At least one cryostat comprising a cryostat tube (or "cryostat enclosure") 110 and a suitably chilled interior 111 is coupled to cold bridge 114. Cryogenic materials that might be provided within interior 111 include, for example, nitrogen, argon, krypton, and the like. In accordance with one aspect of the invention, cryostat tubes 110 are oriented such that their axes (e.g., the major axis of the resulting cylinder) are non-collinear with respect to the optical axis of FPA 116. In the illustrated embodiment, for example, two cryostat tubes 110 are situated on opposite sides of cold shield 112 such that their longitudinal axes are parallel to, but non-collinear with, the axes of FPA 116. Cryostat interior 111 may include cryogenic materials or any other components and materials capable of cooling the system.

Figure 5:
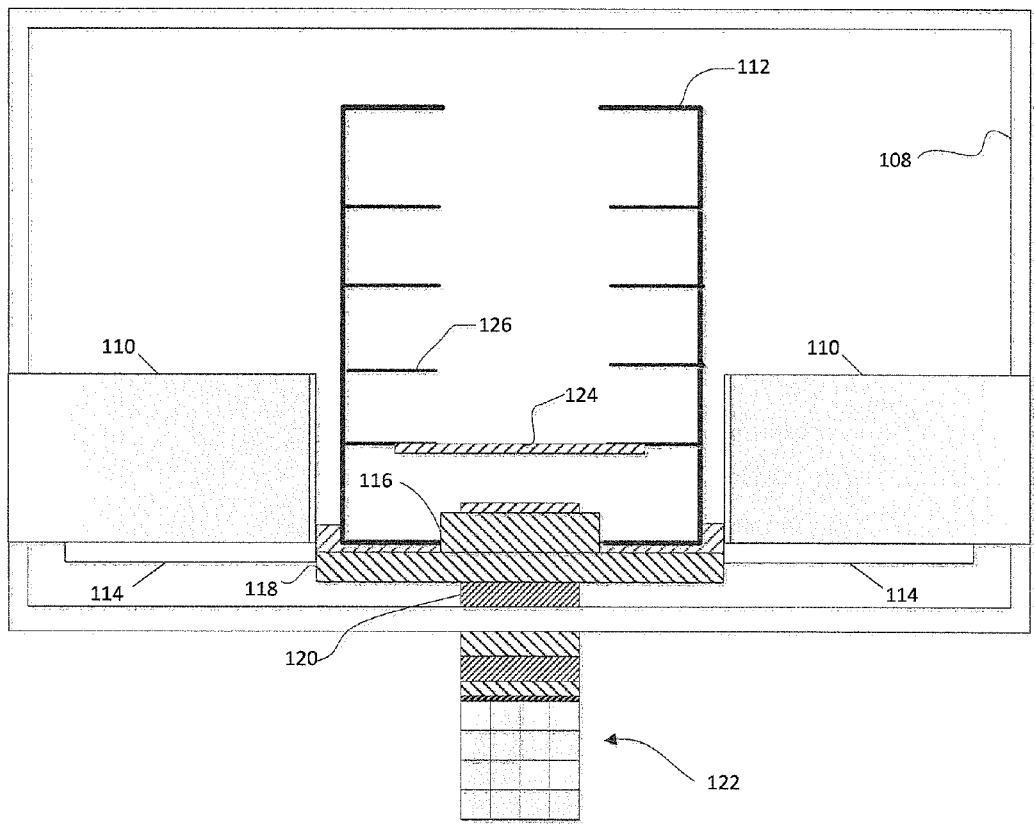
FIG. 5 depicts a cross-sectional view of another embodiment of a Dewar assembly.

It will be appreciated that the configuration depicted in FIGS. 1 and 2 are non-limiting, and that the present invention comprehends ay number of cryostat tubes oriented in any number of ways. For example, in an alternate embodiment, the cryostat tubes 110 are substantially orthogonal to the optical axis of FPA 116, as depicted in FIG. 5.

As shown, a ceramic vacuum feedthrough 122 and associated harness carrier 120 are used to provide electrical connections to FPA 116, as is conventional. A flange 106 is bonded to enclosure 108, and will typically include a window 104 aligned with opening 105 along the optical axis. A mount 102 may be used to couple cryostat tubes 110 to flange 106. As shown in FIG. 2, a pinch-off tube 128 is typically integrated into enclosure 108.

Optionally, one or more gussets or thermo-mechanical interconnects may be used to bridge between tubes 110 and cold shield 112, depending upon the desired heat transfer performance.

The materials used for the various components may be selected to achieve any particular heat-transfer and structural design goals. In a preferred embodiment, cold bridge 114 comprises a metallic, high-conductivity material, such as molybdenum, copper, and/or beryllium. In a further embodiment, carrier 118 comprises alumina or other suitable material.

In accordance with one aspect of the invention, the use of cold bridge 114 and carrier 118 as disclosed allows for a variety of compact configurations and orientations, and at the same time provides improved heat transfer capabilities due to the simplified metal-to-metal connections. That is referring now to the close-up view of FIG. 3, cryostat tube 110 may be connected, joined, or otherwise bonded (at region 310) along an outer edge of cold bridge 114 using a brazing, welding, soldering or other direct metal joining operation. Similarly, cold shield 112 may be coupled (at region 312) using a similar metal-joining operation. Regions 314 and 316 indicate, respectively, the bond region between cold bridge 114 and carrier 118, and the bond region between FPA 116 and carrier 118. Such bonds might include, for example, known adhesive and conductive epoxy connections.

As illustrated, FPA 116 might include any number of separate components, such as a primary semiconductor sensing device 308 and any number of bonding and related components 302.

Figure 4:
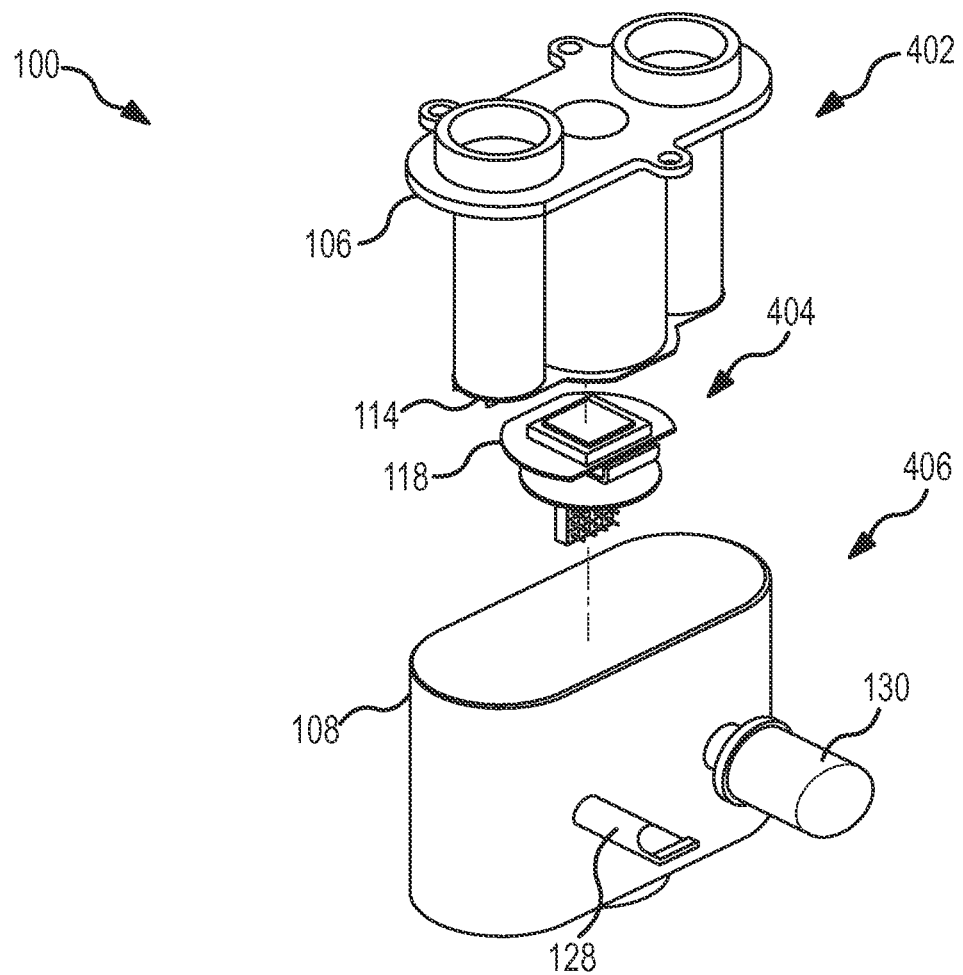
FIG. 4 depicts a subassembly method for the exemplary Dewar assembly of FIG. 1.

Referring to FIG. 4, the configuration of components shown in FIGS. 1 and 2 have the advantage that they can be easily fabricated in three separate subassemblies, using optimum processing methods for each, and then assembled into a finished Dewar assembly 100.

For example, a first subassembly 404 may be formed by coupling the FPA component to carrier 118 as well as any related harnesses and interconnects, and a second subassembly 402 may be formed by coupling the cryostat tubes 110 and the cold shield to the cold bridge 114. Thus, relatively high-temperature operations (brazing, welding, etc.) may be used for metal bonding of the components of subassembly 402, while relatively low-temperature operations (pastes, etc.), may be used for subassembly 404. After which, the first subassembly 402 is coupled to second assembly 404 such that cold bridge 114 is thermally contiguous with carrier 118.

A third enclosure subassembly 406 can then be used to house the combined subassemblies 404 and 402 (i.e., by bonding flange 106 to enclosure 108.) A getter 130 may also be incorporated into enclosure 108.

It will be appreciated that the present invention provides advantages with respect to balancing the competing objectives of such Dewars. The larger stance of the cryostat bores (along with optional structural gussets), provides line-of-sight stability. At the same time, the enhanced thermal path to the cold shield allows for a long cold shield for effective shielding that can be cooled sufficiently within allowable time lines to minimize the FPA receiver noise. And as the cryostat is not aligned with and positioned in back of the FPA, there are more options for enhancing cooling paths, particularly to the cold shield.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A Dewar apparatus, comprising:
   a carrier having a planar first surface;
   a focal plane array component coupled to a first portion of the first surface of the carrier and having an optical axis;
   a cold bridge coupled to a second portion of the first surface of the carrier along a perimeter of the carrier and not covering the first portion of the first surface of the carrier, the second portion of the first surface of the carrier separated from the first portion of the first surface of the carrier;
   a cold shield aligned with the optical axis and coupled to the cold bridge; and
   a plurality of cryostat enclosures laterally beside at least one portion of the cold shield, each cryostat enclosure coupled to the cold bridge and having a major axis that is noncollinear with respect to the optical axis;
   wherein the cold shield is disposed between the cryostat enclosures.

2. The apparatus of claim 1, wherein the major axis of each cryostat enclosure is parallel to, but noncollinear with, the optical axis.

3. The apparatus of claim 1, wherein the major axis of each cryostat enclosure is substantially orthogonal to the optical axis.

4. The apparatus of claim 1, wherein each cryostat enclosure is coupled to a portion of the cold bridge extending beyond the perimeter of the carrier.

5. The apparatus of claim 1, wherein the cold bridge comprises a metallic material.

6. The apparatus of claim 5, wherein the metallic material is selected from the group consisting of molybdenum, copper, and beryllium.

7. The apparatus of claim 1, wherein the carrier comprises alumina.

8. A method, comprising:
   forming a first subassembly by coupling a focal plane array component having an optical axis to a first portion of a planar first surface of a carrier;
   forming a second subassembly by coupling a plurality of cryostat enclosures and a cold shield to a cold bridge; and
   coupling the first subassembly to the second assembly, wherein the cold bridge is coupled to a second portion of the first surface of the carrier along a perimeter of the carrier and does not cover the first portion of the first surface of the carrier, the second portion of the first surface of the carrier separated from the first portion of the first surface of the carrier, and wherein each cryostat enclosure is disposed laterally beside at least a portion of the cold shield and has a major axis that is noncollinear with respect to the optical axis;

wherein the cold shield is disposed between the cryostat enclosures.

9. The method of claim 8, further including:

forming a third subassembly comprising an enclosure; and substantially inserting the first and second subassemblies into the third subassembly.

10. The method of claim 8, wherein coupling the plurality of cryostat enclosures and the cold shield to the cold bridge comprises performing a direct metal bonding operation.

11. The method of claim 8, wherein the cold bridge comprises a metallic material.

12. The method of claim 11, wherein the metallic material is selected from the group consisting of molybdenum, copper, and beryllium.

13. The method of claim 8, wherein the carrier comprises alumina.

14. The method of claim 8, wherein the first subassembly is manufactured using lower-temperature operations, and the second subassembly is manufactured using higher-temperature operations.

15. A Dewar apparatus, comprising:

a carrier having a planar first surface;

a focal plane array component coupled to a first portion of the first surface of the carrier and having an optical axis;

a cold bridge coupled to a second portion of the first surface of the carrier along a perimeter of the carrier and not covering the first portion of the first surface of the carrier, the second portion of the first surface of the carrier separated from the first portion of the first surface of the carrier;

a cold shield aligned with the optical axis and coupled to the cold bridge via a direct metal bond; and a plurality of cryostat enclosures laterally beside at least one portion of the cold shield, each cryostat enclosure coupled to the cold bridge via a direct metal bond and having a major axis that is noncollinear with the optical axis;

wherein the cold shield is disposed between the cryostat enclosures.

16. The apparatus of claim 15, wherein the major axis of each cryostat enclosure is parallel to, but noncollinear with, the optical axis.

17. The apparatus of claim 15, wherein the major axis of each cryostat enclosure is substantially orthogonal to the optical axis.

18. The apparatus of claim 15, wherein each cryostat enclosure is coupled to a portion of the cold bridge extending beyond the perimeter of the carrier.

19. The apparatus of claim 15, wherein the cold bridge comprises a metallic material selected from the group consisting of molybdenum, copper, and beryllium.

20. The apparatus of claim 15, wherein the carrier comprises alumina.

21. The apparatus of claim 1, wherein the cold shield is disposed between two different cryostat enclosures located on opposite sides of the cold shield.

* * * * *